3,147,623
BOURDON GAUGE MOUNTING
Leon D. Johnson, Sellersville, and James D. Fulmer, Quakertown, Pa., assignors to Ametek, Inc., New York, N.Y., a corporation of Delaware
Filed Jan. 15, 1962, Ser. No. 166,090
3 Claims. (Cl. 73—418)

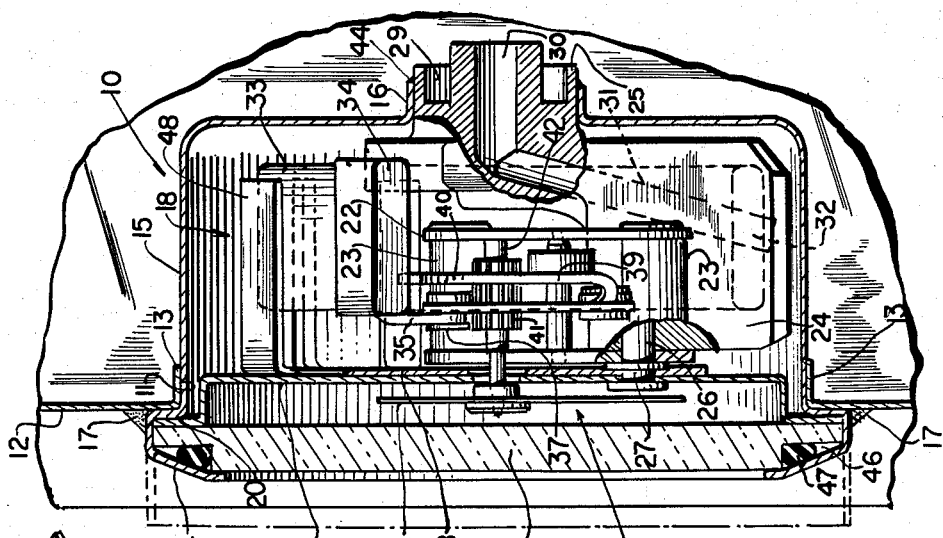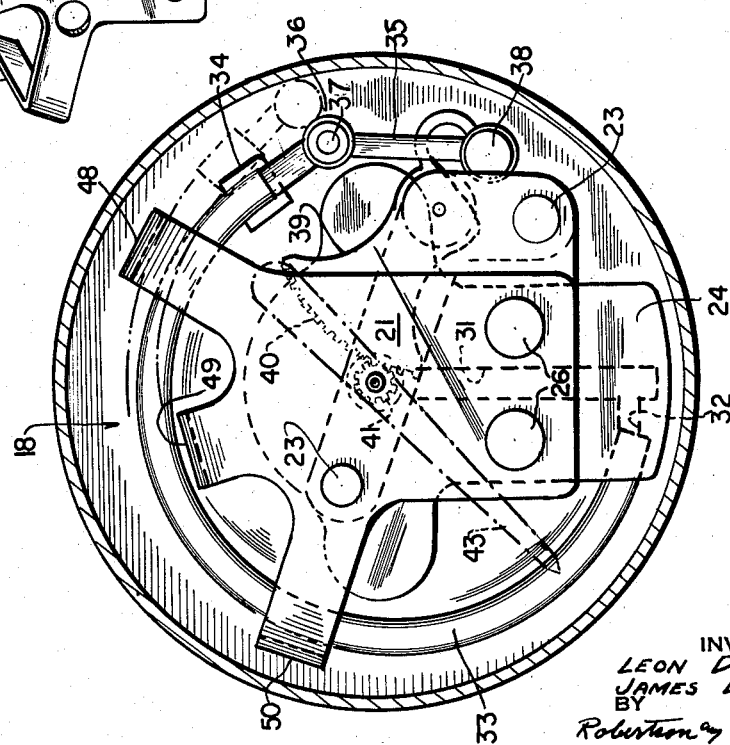
INVENTORS
LEON D. JOHNSON
JAMES D. FULLMER
BY
Robertson + Smythe
ATTORNEYS

United States Patent Office 3,147,623
Patented Sept. 8, 1964

The present invention relates to gauges and particularly to a new and improved Bourdon tube type of gauge and to its method of manufacture.

The manufacture of Bourdon tube gauges and, particularly, their assembly to portable pressure containers present certain problems including, for example, the mounting of the gauge mechanism in the lid or wall of a container so that the gauge mechanism is properly sealed from the pressure medium within the container with the socket opening in communication with said pressure medium. Again, when the container is portable, it may accidentally be dropped, causing excessive vibration of the Bourdon tube to the point where it may be damaged even though the stop means at the free end of the tube may properly function.

The principal object of this invention is to provide a method of mounting a Bourdon tube gauge within a lid or wall of a pressure container such that the internal mechanism can be effectively sealed against the pressure medium within the container.

Another object of the invention is to provide such a method in which the assembly of the internal gauge mechanism is not subjected to any deleterious effects incident to soldering or other heat sealing means although such sealing is employed.

Still another object of the invention is to provide such a Bourdon tube type of gauge in which the tube is prevented from vibrating excessively should the gauge be subjected to shock.

In one aspect of the invention, a lid or wall of the pressure container may be provided with an opening adapted to receive a gauge casing that may extend into the container. A cylindrical casing may have joined together outer, intermediate and inner diameter portions, in which the outer diameter portion is greater than the intermediate, and the inner diameter portion is much less than the intermediate. The intermediate diameter portion may be received within the opening in the lid or wall and be of such length as to entirely receive the internal gauge mechanism, while the inner diameter portion may be capable of receiving a cylindrical portion of the gauge socket.

In another aspect of the invention, a solder or other heat sealing ring may secure the case to the outer surface of the lid or wall prior to the insertion of the internal gauge mechanism into the casing.

In another aspect of the invention, the gauge dial may support the entire internal mechanism of the gauge and it may include a flange having an outside diameter greater than that of the intermediate portion of the casing but less than the outer diameter portion of the casing. The internal mechanism of the gauge may be mounted on the dial such that the cylindrical portion of the gauge socket is centrally disposed relative to the dial and substantially in alignment, when in assembled relation, with the inner diameter portion of the casing. In this way, the dial with the internal mechanism attached thereto may be received within the intermediate portion of the casing with the cylinder portion of the socket received within the inner diameter portion of the casing.

In still another aspect of the invention, a transparent plate or crystal may be located within the outer diameter portion of the casing in contact with the dial flange, and a sealing gasket or ring may be mounted at the peripheral edge of the crystal. The remainder of the outer diameter portion of the casing extending outwardly from the crystal may then be spun or otherwise turned inwardly so as to overlap the sealing gasket, thereby firmly holding the dial and internal gauge mechanism within the casing. A sealing solder or other heat sealing ring may then be provided around the mating edges and surface of the cylindrical portion of the socket and inner diameter portion of the casing without regard for the looseness of the fit of these mating parts so that even with a relatively loose fit, an adequate seal can be provided.

In still another aspect of the invention, a vibration limiting member may be located between the dial and internal mechanism, and it may include a plurality of fingers that have portions overlying the Bourdon tube, both radially inwardly and outwardly of the tube at arcuately spaced points along its curved extent.

The above, other objects and novel features of the invention will become apparent from the following specification and accompanying drawing which is merely exemplary.

In the drawing:

FIG. 1 is a sectional elevational view of a Bourdon tube gauge to which the principles of the invention have been applied;

FIG. 2 is a sectional view taken substantially along line 2—2 of FIG. 1; and

FIG. 3 is a perspective view of the vibration limiting element shown in FIGS. 1 and 2.

Referring to FIGS. 1 and 2, the principles of the invention are shown as applied to a Bourdon tube gauge mounted within a casing 10 that is held within an opening 11 of a lid or wall 12 of a pressure container, the opening 11 being shown as formed by an inturned flange 13.

The casing 10, which in the embodiment disclosed is shown as cylindrical, may include three portions 14, 15 and 16 of different diameters. The outer portion 14 may have a diameter greater than that of opening 11; the intermediate portion 15 may have a diameter adapted to be received within the opening 11; and the inner portion 16 may have a diameter much less than that of portion 15.

The casing 10 may be fitted into the opening 11 with the radial portion between portions 14 and 15 abutting the outside surface of the lid 12. A solder ring 17, or other similar sealing rings, may hermetically seal the casing to the lid 12.

A Bourdon tube gauge 18 may include a dial 19 having a flange 20 of greater diameter than that of the intermediate portion 15 and less than the diameter of outer portion 14 of casing 10. The internal mechanism or movement of the gauge 18 may be supported entirely from the dial 19. This movement may include a front plate 21 and a back plate 22 that are fixed together in parallel spaced relation by studs 23. A socket 24 may comprise a casting including a cylindrical portion 25 having a diameter adapted to pass through the inner portion 16 of casing 10, as will appear hereinafter. The side of socket 24 opposite that including portion 25 may be fixed to the front plate 21 by fastening means 26 that includes a collared portion 27 rigidly holding the socket 24, the plates 21 and 22 to the dial 19, with a vibration dampening element 28 between the dial 19 and the front plate 21 for a purpose to be described later.

The cylindrical portion 25 may include a recessed annular portion 29, for a purpose to be described later, and an inlet 30. The inlet 30 may lead to a passage 31 that is connected at 32 to one end of a Bourdon tube 33 of usual construction. The free end of tube 33 is closed by a tip 34. A link 35, fixed to tip 34, is pivotally connected at 36 by rivet 37. The opposite end of link 35 is pivoted at 38 to one end of a quadrant 39 that is pivotally mounted between plates 21 and 22 in the usual fashion. The quadrant is provided with teeth 40 that mesh with a pinion 41 fixed to a spindle 42 journaled in aligned bearings in plates 21 and 22. A hand 43 is connected to spindle 42 for cooperation with the dial 19.

From the foregoing it is evident that the gauge movement is totally supported by the dial 19, and that the cylindrical portion 25 of the socket 24 is concentric with the spindle 42. In assembling the gauge, with the cylindrical portion 14 in its dotted line position, the dial 19 and movement are inserted into the casing such that the cylindrical portion 25 is received within the portion 16 of the casing 10 and the flange 20 abuts the wall between the outer and intermediate portions 14, 15 of casing 10. A ring 44 of solder or other sealing means may form an hermetical seal about the portion 25 of the socket 24 and the portion 16 of casing 10. It is apparent that no critical tolerance is required between the portions 16 and 25 since any looseness may be overcome by the solder ring 44. Furthermore, the formation of the recess 29 permits the rapid removal of heat as the solder ring is being applied, thereby preventing such heat from adversely affecting a soldered joint at 32.

A transparent face or crystal 45 may be inserted into the portion 14 of casing 10. The crystal may include a stepped portion 46 for supporting a gasket 47. Finally, the portion 14 may be spun or otherwise formed into the condition shown in solid lines, thereby holding the crystal and gasket in proper position within casing 10.

The element 28 may include three or more fingers, and in the embodiment disclosed, three such fingers 48, 49 and 50 are shown. The fingers 48 and 50 are spaced from the outer surface of Bourdon tube 33 an amount to permit its free normal outward movement; and finger 49 is spaced from the inner surface of tube 33 an amount to permit its free normal inward movement. These fingers may be spaced at intervals along the tube 33 and will prevent excessive vibratory movement of the tube 33 in the event the tube is subjected to shocks that might otherwise adversely affect it, such as might occur should the container to which the gauge is applied be inadvertently dropped.

Although the various features of the new and improved gauge have been shown and described in detail to fully disclose one embodiment of the invention, it will be evident that changes may be made in such details and certain features may be used without others without departing from the principles of the invention.

What is claimed is:

1. In a pressure container, said container having an opening in one of its walls; a casing adapted to be mounted within said opening, said casing having an outer portion, an intermediate portion and an inner portion; means forming an hermetical seal between said casing and pressure container wall; a gauge dial mounted within said casing; a gauge movement including a socket fixed to spaced parallel plates, said socket having a cylindrical portion adapted to extend through said inner casing portion; a Bourdon tube connected to said socket and to a movement located between said parallel plates; said socket providing an opening directly to the interior of said pressure container and to actuate said Bourdon tube; an hermetical seal between said inner portion of said casing and said socket; and distortion preventing means mounted on holding means within said casing, said distortion preventing means having surfaces at spaced points along said Bourdon tube for preventing excessive distortion of said tube when said container is subjected to shock.

2. In a pressure container, said container having an opening in one of its walls; a casing adapted to be mounted within said opening, said casing having an outer portion, an intermediate portion and an inner portion; means forming an hermetical seal between said casing and pressure container wall; a gauge dial mounted within said casing; a gauge movement including a socket fixed to spaced parallel plates, said socket having a cylindrical portion adapted to extend through said inner casing portion; a Bourdon tube connected to said socket and to a movement located between said parallel plates; said socket providing an opening directly to the interior of said pressure container and to actuate said Bourdon tube; an hermetical seal between said inner portion of said casing and said socket; and a plate containing a plurality of spaced fingers mounted between said dial and one of said parallel plates, said fingers being located at spaced points along said Bourdon tube for preventing excessive distortion of said tube when said container is subjected to shock.

3. In a pressure container, said container having an opening in one of its walls; a casing adapted to be mounted within said opening, said casing having an outer portion, an intermediate portion and an inner portion; means forming an hermetical seal between said casing and pressure container wall; a gauge dial mounted within said casing; a gauge movement including a socket fixed to spaced parallel plates, said socket having a cylindrical portion adapted to extend through said inner casing portion; a Bourdon tube connected to said socket and to a movement located between said parallel plates; said socket providing an opening directly to the interior of said pressure container and to actuate said Bourdon tube; an hermetical seal between said inner portion of said casing and said socket; and a plate containing a plurality of spaced fingers mounted between said dial and one of said parallel plates, certain of said fingers being located above the outer surface and below the inner surface of said Bourdon tube, for preventing excessive distortion of said tube when said container is subjected to shock.

References Cited in the file of this patent

UNITED STATES PATENTS

| | | |
|---|---|---|
| 1,252,682 | Gelatt | Jan. 8, 1918 |
| 1,539,101 | Adams | May 26, 1925 |
| 1,731,520 | Bayha et al. | Oct. 15, 1929 |
| 2,558,743 | Ford | July 3, 1951 |
| 2,618,978 | Ragland | Nov. 25, 1952 |
| 2,676,490 | Willach | Apr. 27, 1954 |
| 2,693,112 | Beck | Nov. 2, 1954 |
| 2,821,855 | Le Van | Feb. 4, 1958 |
| 2,897,675 | Kocher et al. | Aug. 4, 1959 |

FOREIGN PATENTS

| | | |
|---|---|---|
| 1,134,407 | France | Dec. 3, 1956 |